(12) United States Patent
Takeda

(10) Patent No.: US 6,560,183 B2
(45) Date of Patent: May 6, 2003

(54) REPRODUCTION APPARATUS OF OPTICAL DISK

(75) Inventor: Kunio Takeda, Kanagawa-Ken (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 211 days.

(21) Appl. No.: 09/768,562

(22) Filed: Jan. 24, 2001

(65) Prior Publication Data

US 2001/0015947 A1 Aug. 23, 2001

(30) Foreign Application Priority Data

Jan. 26, 2000 (JP) ..................................... 2000-016589

(51) Int. Cl.[7] .............................................. G11B 33/02
(52) U.S. Cl. ..................................... 369/75.2; 369/77.1
(58) Field of Search ............................... 369/75.2, 75.1, 369/77.1, 77.2, 30.36, 195, 199, 30.14, 44.11, 53.45, 19; 360/72.2, 99.06

(56) References Cited

U.S. PATENT DOCUMENTS

| | | | | |
|---|---|---|---|---|
| 4,829,502 A | * | 5/1989 | Aoyagi et al. | |
| 4,839,881 A | * | 6/1989 | Takahara et al. | |
| 4,879,705 A | * | 11/1989 | Aoyagi et al. | |
| 5,164,934 A | * | 11/1992 | Kase et al. | |
| 6,169,711 B1 | * | 1/2001 | Koh | |

* cited by examiner

Primary Examiner—Ali Neyzari
(74) Attorney, Agent, or Firm—Michael E. Belk

(57) ABSTRACT

In a reproduction apparatus of an optical disk configured for sliding a placement tray so as to take protrusion and accommodation positions with respect to an apparatus body, sliding of the placement tray is started at a low speed and the placed optical disk is held stable irrespective of variation in environmental conditions. The present apparatus is configured so that calculation means 21 of control means 15 outputs a command signal for stepwise increasing an applied voltage to an output motor 16 until a placement tray 3 starts sliding to a drive power source 8 if an initial applied voltage in which the drive power source 8 is the low applied voltage is supplied to the output motor 16 of driving means 14 for driving and sliding the placement tray 3 and the placement tray 3 does not slide due to a large load applied on the placement tray 3.

2 Claims, 4 Drawing Sheets

REPRODUCTION APPARATUS OF OPTICAL DISK

The present invention relates to an optical disk reproduction apparatus which slides a placement tray for placing an optical disk relative to an apparatus body so as to take a protrusion position for placing and taking out the optical disk and an accommodation position for reproducing the optical disk, and more particularly to control of speed when starting the placement tray sliding relative to the apparatus body.

SUMMARY OF THE INVENTION

In an optical disk reproduction apparatus which slides a placement tray for placing an optical disk so as to take a protrusion position and an accommodation position relative to an apparatus body, when starting the placement tray sliding relative to the apparatus body, up to now an initial applied voltage to cope with starting the placement tray surely sliding relative to the apparatus body has been supplied from a drive power source to an output motor.

A load imposed when attempting to start a placement tray sliding is generally larger in comparison with a load imposed when the placement tray is sliding.

And it is known that a load imposed when a placement tray starts sliding varies greatly according to such an environmental condition as temperature, humidity and the like.

On the other hand, since an optical disk reproduction apparatus which slides a placement tray for placing an optical disk so as to take a protrusion position and an accommodation position relative to an apparatus body needs to start sliding as keeping the optical disk on the placement tray in a stable state, it is desirable to start the placement tray sliding as slow as possible relative to the apparatus body at the start of sliding the placement tray.

However, since an optical disk reproduction apparatus needs to surely start a placement tray sliding relative to an apparatus body under any environment, up to now a high applied voltage to cope with the maximum load expected has been supplied to an output motor at the start of sliding.

Due to this, there has been a problem that the output motor supplied with a high applied voltage outputs a large driving force to the placement tray and as a result this makes the placement tray start sliding relative to the apparatus body at a higher speed than a desired speed and cannot make the placement tray start sliding at a low speed.

Therefore, when the speed at the start of sliding when the placement tray slides from the protrusion position to the accommodation position relative to the apparatus body, due to a fact that the placement tray abruptly starts sliding, the optical disk placed on the placement tray is slipped off from a specified position of the placement tray and as a result it is difficult to place the optical disk on a turntable, and the problem has been more grave.

The present invention has been performed in consideration of the above-mentioned circumstances, and provides an optical disk reproduction apparatus which makes a placement tray for placing an optical disk surely start sliding regardless of variation of an environmental condition under which the apparatus is used when the placement tray starts sliding so as to take an protrusion position and an accommodation position relative to the apparatus body, and furthermore which apparatus makes the placement tray start sliding at a desired speed without starting at a higher speed than a necessary speed and thereby keeps surely the optical disk placed on the placement tray in a stable state and as a result, can surely mount the optical disk on a turntable.

The present invention is an optical disk reproduction apparatus which increases the driving force of a driving means for slide-driving a placement tray from a certain value until the placement tray starts sliding when making the placement tray start sliding relative to an apparatus body.

A detailed composition of the present invention is a reproduction apparatus of an optical disk, comprising an apparatus body inside which pickup means for picking up recorded information from the optical disk is provided, a placement tray for placing the optical disk, and slide means for sliding the placement tray so as to take a protrusion position for placing and taking out the optical disk and an accommodation position for reproducing the optical disk with respect to the apparatus body, characterized in that the slide means includes driving means having an output motor and a drive power source for supplying an applied voltage to the output motor, the driving means applying a driving force for sliding the placement tray to the apparatus body to the placement tray, and control means for controlling the applied voltage of the drive power source so as to increase the applied voltage supplied to the output motor until the placement tray starts sliding in the case that the placement tray keeps a stop state not to start sliding even though an initial applied voltage which the drive power source of the driving means supplies to the output motor when the placement tray starts sliding to the apparatus body is preset and the preset initial applied voltage is supplied to the output motor by the drive power source.

In an optical disk reproduction apparatus having the above-mentioned composition, detection means for detecting that the placement tray starts sliding to the apparatus body comprises a rotator for rotating by rotational output of the output motor of the driving means, the rotator to which a striped pattern extending in the radial direction is formed, and an optical sensor for sensing rotation of the striped pattern of the rotator through optical tone variation.

In an optical disk reproduction apparatus having such a composition, when a placement tray starts sliding relative to an apparatus body, in case that the placement tray keeps a stop state and does not start sliding relative to the apparatus body even if a drive power source gives an initial applied voltage to an output motor, a control means controls the drive power source so as to increase the applied voltage to be supplied from the drive power source to the output motor until the placement tray starts sliding.

And in an optical disk reproduction apparatus having such a composition, when the placement tray slides, a rotator turns and an optical sensor senses rotation of the rotator through optical tone variation caused by a striped pattern and detects that the placement tray is sliding.

An embodiment of the present invention is described with reference to the drawings in the following. However, the present invention is not limited to this embodiment. In the drawings:

DETAILED DESCRIPTION OF THE INVENTION

Figure 1:
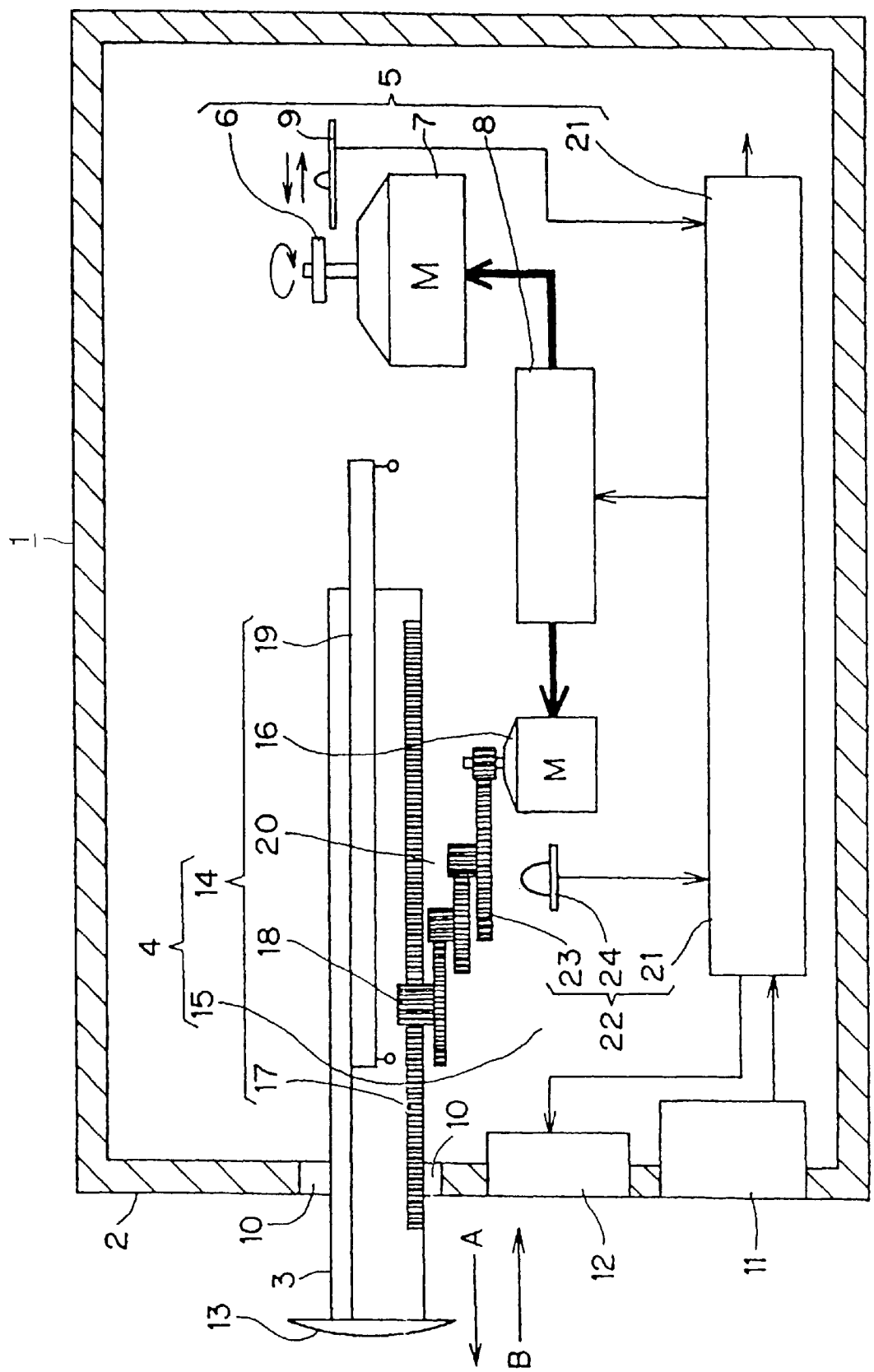
FIG. 1 is a composition explaining figure for explaining the composition of an embodiment of the present invention.

An optical disk reproduction apparatus 1 as shown in FIG. 1 comprises an apparatus body 2, a placement tray 3 and a slide means 4, as shown in FIG. 1.

The apparatus body 2 is nearly box-shaped, in which a pickup means 5 for optically picking up recorded information from an optical disk is provided.

The pickup means 5 is composed of a turntable 6 for having an optical disk mounted on it, an output motor 7 for rotationally driving the turntable 6, a drive power source 8 for supplying an applied voltage for making the output motor 7 output, an information reading means 9 for reproducing an optical disk placed on the turntable 6, namely, for optically reading recorded information from the optical disk, and a computing means 21 for performing each signal processing.

The apparatus body 2 has an opening 10 for drawing in and out the placement tray provided in its front face and further has an operation part 11 and a display panel 12 provided.

The display panel 12 displays the on state of the main power source, information related to an optical disk to be reproduced and the like when the optical disk reproduction apparatus 1 is used.

And the opening 10 is shut up by a lid 13 provided on the front part of the placement tray 3 when the placement tray 3 is accommodated in the apparatus body 2.

The slide means 4 is used for sliding the placement tray 3 in the arrow directions A and B relative to the apparatus body 2 so that the placement tray 3 takes a protrusion position and an accommodation position relative to the apparatus body 2 in order to place and take out an optical disk.

The sliding means 4 is mainly composed of a driving means 14 and a control means 15.

The driving means 14 gives the placement tray 3 a driving force for the placement tray 3 to slide relative to the apparatus body 2.

The driving means 14 is composed mainly of an output motor 16, a drive power source 8 for supplying an applied voltage to the output motor 16, a rack gear 17 provided on the bottom face of the placement tray 3, a pinion gear 18 engaging with the rack gear 17, a guide member 19 for guiding the placement tray 3 in its sliding directions (directions of arrows A and B), and a gear train 20 is disposed between the output motor 16 and the pinion gear 18.

Limiters (not illustrated) for making the placement tray 3 stop sliding in cooperation with the placement tray 3 are provided respectively at the front end and the rear end of the guide member 19.

The control means 15 has an initial applied voltage (1.8 V) set in advance, said initial applied voltage being to be supplied to the output motor 16 by the drive power source 8 of the driving means 14 when the placement tray 3 which has received a driving force from the driving means 14 starts sliding relative to the apparatus body 2.

And the control means 15 controls an applied voltage of the drive power source 8 so as to increase the applied voltage to be supplied to the output motor 16 by 0.2 V every 0.3 second until the placement tray 3 starts sliding, in case that the placement tray 3 keeps a stop state and does not start sliding even though the drive power source supplies the preset initial applied voltage to the output motor 16.

An initial applied voltage to be supplied which is described here means the lowest voltage or a voltage slightly lower than the lowest voltage being ordinarily most frequently supplied among applied voltages to be supplied to the output motor 16 from the drive power source 8 in case that the placement tray 3 starts sliding when the optical disk reproduction apparatus 1 is used.

Figure 2:
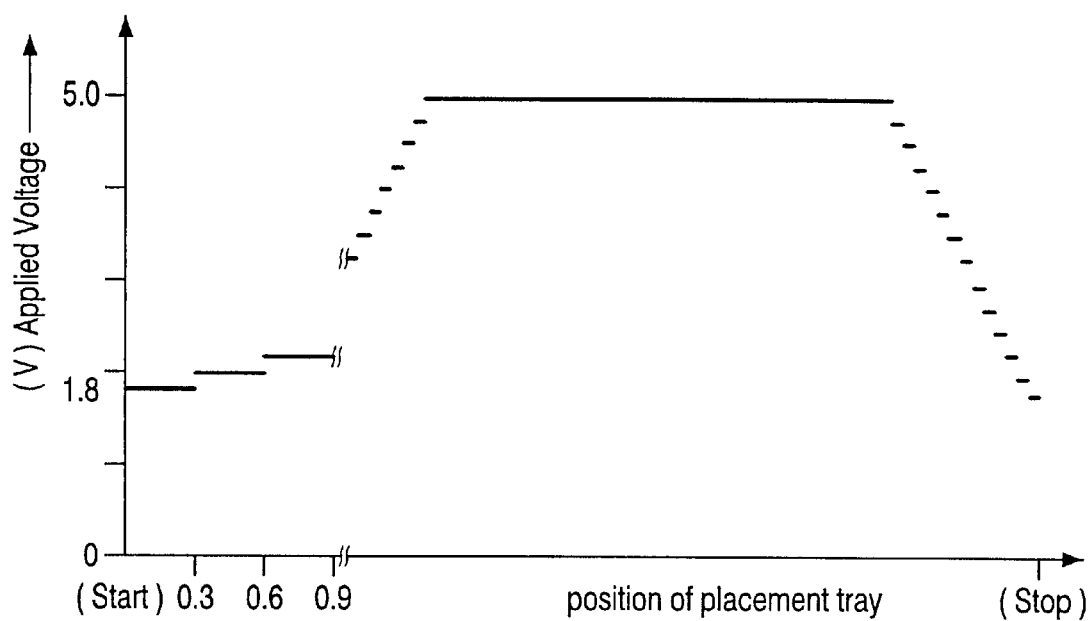
FIG. 2 is a timing chart for explaining a change with the passage of time in applied voltage for a drive power source to supply to an output motor when operating the driving means so as to make a placement tray take a protrusion position from an accommodation position relative to an apparatus body or when operating the driving means so as to make the placement tray take the accommodation position from the protrusion position in the embodiment shown in FIG. 1.

And applied voltages to be supplied to the output motor 16 from the drive power source 8 of the driving means 14 when the driving means 14 drives the placement tray 3 to slide from the accommodation position to the protrusion position relative to the apparatus body 2 are as shown in FIG. 2.

In short, the initial applied voltage when the driving means 14 drives the placement tray 3 to start sliding is 1.8 V.

On the other hand, applied voltages to be supplied to the output motor 16 from the drive power source 8 of the driving means 14 when the driving means 14 drives the placement tray 3 to slide from the protrusion position to the accommodation position relative to the apparatus body 2 are also as shown in FIG. 2.

In short, the initial applied voltage when the driving means 14 drives the placement tray 3 to start sliding is 1.8 V in the same way as described above.

The control means 15 is composed mainly of a computing means 21 in which an initial applied voltage set in advance is stored and a detection means 22 for detecting sliding of the placement tray 3.

The computing means 21 has a timer (not illustrated) built in it and counts a period of time from the time when it has outputted a signal of an output instruction to the drive power source 8.

The detection means 22 is composed mainly of a rotator 23 which is attached coaxially to a gear in the gear train 20 turned by receiving a rotational output from the output motor 16 of the driving means 14 and is provided with a striped pattern extending in radial directions and an optical sensor 24 for optically sensing variation in brightness of the striped pattern caused by rotation of the rotator 23.

In other words, in the control means 15, when the driving means 14 outputs a driving force and the placement tray starts sliding, the gear train 20 operates, and the detection means 22 detects that the placement tray 3 has started sliding by detecting whether or not the gear train operates.

Figure 4:
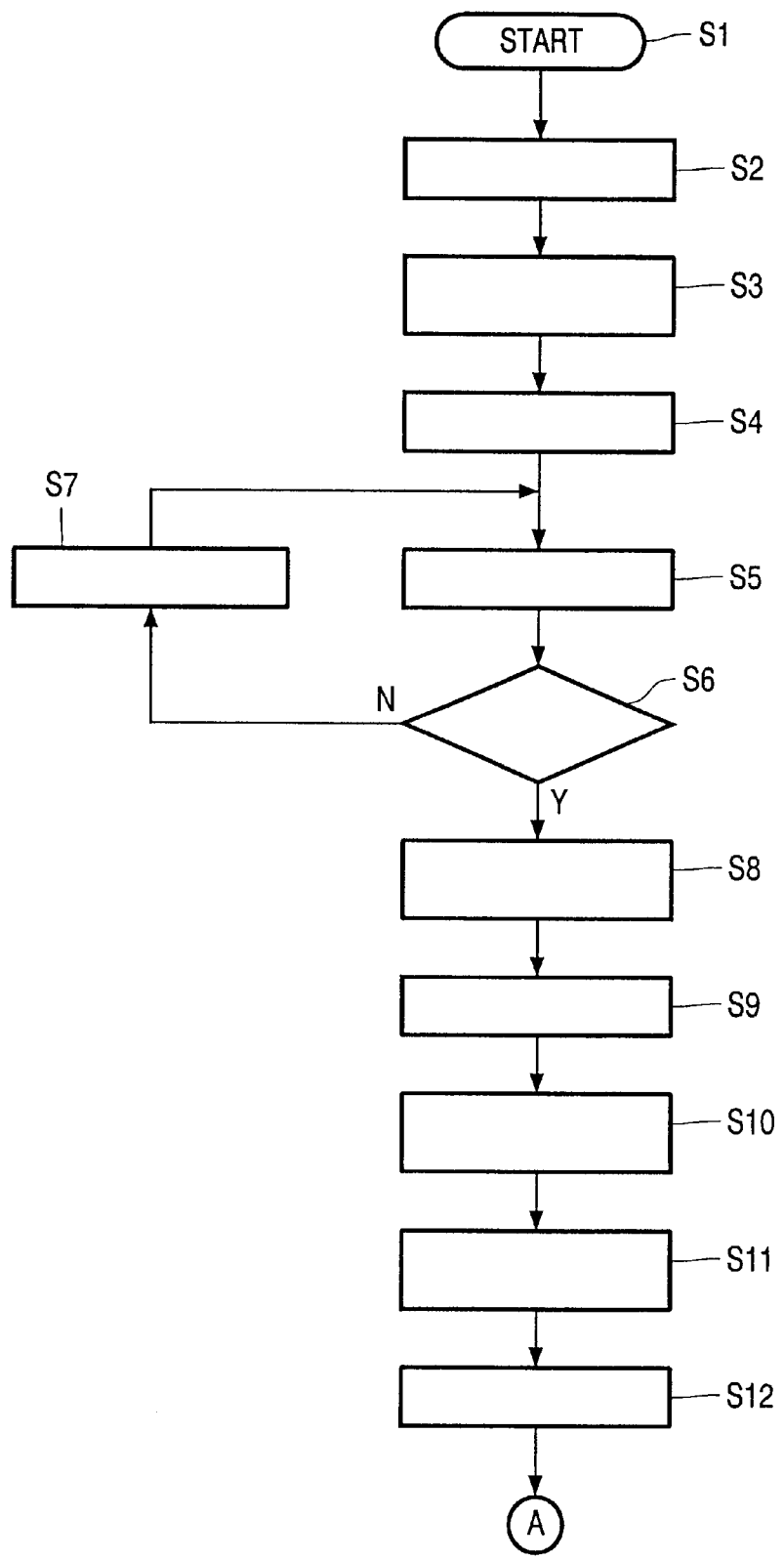
FIG. 4 is a flowchart for explaining operation from the start to reproduction of an optical disk in the embodiment shown in FIG. 1.

The optical disk reproduction apparatus 1 is composed as described above. Operation of the optical disk reproduction apparatus 1 is described with reference to a flowchart shown in FIG. 4 in the following.

In step S1 a user turns on the main power source by operating the operation part 11.

In step S2, in order to place a desired optical disk on the placement tray 3, the user operates the operation part 11 to make the driving means 14 output so that the placement tray comes from the accommodation position to the protrusion position relative to the apparatus body 2.

In step S3 the computing means 21 outputs a signal for making the driving means 14 output on the basis of a signal inputted from the operation part 11.

Namely, the computing means 21 outputs to the drive power source 8 a signal for supplying the output motor 16 with an initial applied voltage of 1.8 V being the lowest voltage or a voltage slightly lower than it, said lowest voltage being most frequently supplied to the output motor 16 from the drive power source 8 when the placement tray 3 starts sliding.

When the output motor 16 is supplied with an initial applied voltage of 1.8 V from the drive power source 8, it attempts to output rotation (Step S4).

Hereupon, in case that the rotational output transferred from the output motor 16 to the pinion gear 18 through the gear train 20 is larger than a load imposed when the placement tray 3 starts sliding, the rotational output from the pinion gear 18 starts the placement tray sliding in the direction of arrow A through the rack gear 17.

In step S6 it is detected whether the placement tray has started to move. In an embodiment a movement is detected with detection means comprising a rotator 23 and an optical sensor 24. If the placement tray moves, the rotator 23 is turned by receiving the rotational output from the output motor 16 of the driving means 14 and the optical sensor 24 optically senses variation in brightness of a striped pattern caused by the rotation of the rotator 23 and sends this fact to the computing means 21 by means of a signal.

If a movement is detected, the computing means 21 judges that the placement tray 3 has started sliding and continues sliding.

On the other hand, in case that a load imposed when the placement tray 3 starts sliding is larger than the rotational output transferred from the output motor 16 to the pinion gear 18 through the gear train 20, a state where the placement tray 3 keeps a stop state and does not start sliding continues.

At this time, in the detection means 22 a state where the rotator 23 is at a stop continues and the optical sensor 24 sends a fact that variation in brightness based on the striped pattern of the rotator 23 does not occur to the computing means 21 by means of a signal.

Hereupon, when a state where the placement tray 3 is at a stop and does not start sliding continues, the computing means 21 outputs to the drive power source 8 an instruction signal which instructs the drive power source 8 to apply to the output motor 16 a voltage of 2.0 V being higher by 0.2 V than the initial applied voltage of 1.8 V (See step S7). The higher voltage is applied at a point of time when said built-in timer counts that a preset time of 0.3 second has elapsed after a signal instructing output of the initial applied voltage was outputted to the drive power source 8 (Step S5).

Even though the drive power source 8 applies a voltage of 2.0 V being higher by 0.2 V than the initial applied voltage of 1.8 V to the output motor 16, a state where the placement tray is at a stop state and does not start sliding is kept, and when the detection means 22 notifies the computing means 21 of this fact by means of a signal and said built-in timer counts that further a time of 0.3 second has passed, the computing means 21 outputs to the drive power source 8 an instruction signal which instructs the drive power source 8 to apply to the output motor 16 a voltage of 2.2 V being further higher by 0.2 V than the applied voltage.

In such a way, until the placement tray 3 starts sliding, the computing means 21 sends an output instruction signal to the drive power source 8 so as to apply a voltage further higher by 0.2 V to the output motor 16 of the driving means 14 each time a time of 0.3 second passes (Step S7, S5).

Thereupon, when the rotational output of the output motor 16 is made larger than a load imposed on the placement tray 3, as a result the placement tray 3 starts sliding.

When the placement tray 3 starts sliding, in order to make the placement tray 3 slide at a high speed in the middle course from the start to the stop of sliding of the placement tray 3, the computing means 21 sends an output instruction signal to the drive power source 8 so as to apply a higher voltage for making the output motor 16 of the driving means 14 turn faster.

Namely, when the placement tray 3 starts sliding, the rotator 23 rotates and as a result the optical sensor 24 sends variation in brightness corresponding to the rotation of the rotator 23 to the computing means 21 as a detection signal.

Hereupon, when the computing means 21 receives a signal notifying that the rotator 23 is turning from the optical sensor 24, the computing means 21 outputs an instruction signal to the drive power source 8 so that the applied voltage to the output motor 16 is increased by 0.2 V at a time in stages and finally reaches 5.0 V (Step S8).

The applied voltages to be supplied by the drive power source 8 to the output motor 16 are as shown in FIG. 2 as described above.

The computing means 21, which has received a signal notifying that the rotator 23 is turning from the detection means 22, sends an instruction signal to the driving means 8 so as to supply an applied voltage being higher by 0.2 V at a time in stages to the output motor 16 of the driving means 14.

Hereupon, the output motor 16 supplied with a voltage being higher by 0.2 V at a time in stages from the drive power source 8 of the driving means 14 turns at a higher speed corresponding to the applied voltage, and as a result the placement tray 3 slides relative to the apparatus body 2 at a higher speed in comparison with a speed at the start of sliding (Step S9).

At this time, the detection means 22 sends to the computing means 21 by means of a signal a fact that the optical sensor 24 senses variation in brightness caused by rotation of the striped pattern of the rotator 23, and the computing means 21 computes the position of the placement tray 3 relative to the apparatus body 2 from rotation of the rotator 23 on the basis of the sent signal.

When the placement tray 3 arrives at a certain distance before its stop position, namely, at a certain distance before the most protruding position relative to the apparatus body 2, the computing means 21 senses this fact and sends a signal for suppressing the sliding speed of the placement tray 3 to the drive power source 8 (Step S10).

In other words, the computing means 21 outputs to the drive power source 8 an instruction signal for decreasing the applied voltage to the output motor 16 by 0.2 V at a time in stages so as to be 1.8 V just before the stop of the placement tray 3.

Hereupon, the placement tray 3 decreases its sliding speed correspondingly to the gradually lowered voltage applied to the output motor 16, the placement tray 3 and said limiter attached to the guide member 19 operate in cooperation with each other, and thereby the placement tray 3 stops at the most protruding position relative to the apparatus body 2 (Step S11).

Figure 3:
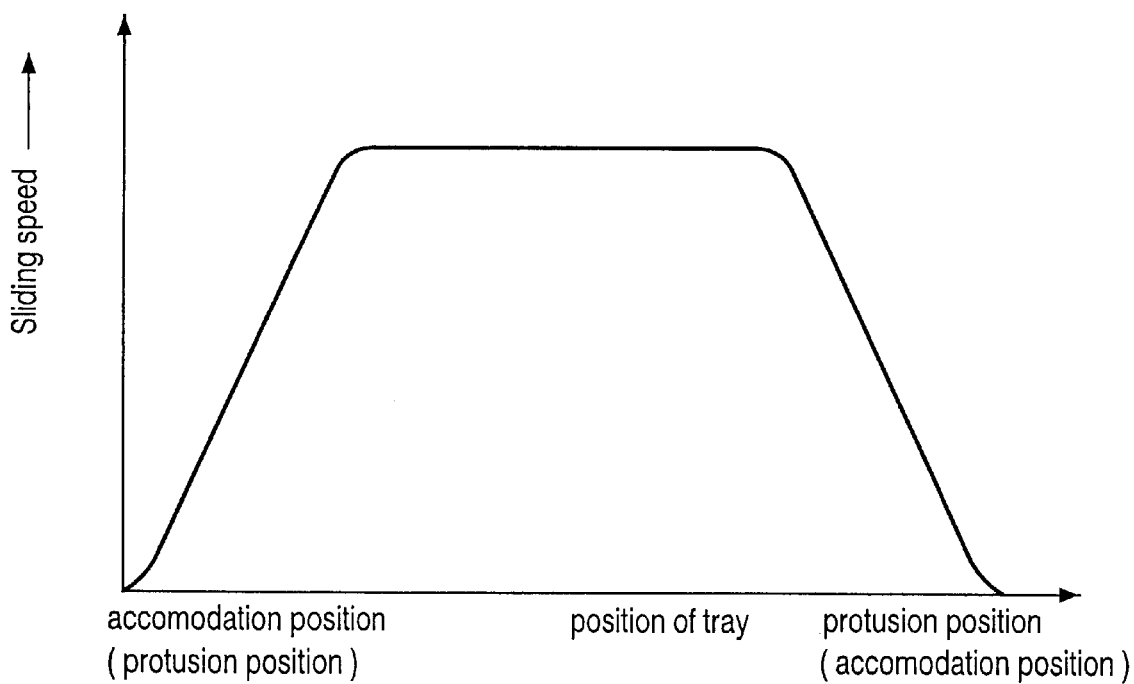
FIG. 3 is a chart showing the relation between the sliding speed and displacement of the placement tray when it slides so as to take the protrusion position from the accommodation position relative to the apparatus body or take the accommodation position from the protrusion position when the drive power source supplies the applied voltages shown in FIG. 2 to the output motor in the embodiment shown in FIG. 1.

The sliding speed of the placement tray 3 from the accommodation position to the protrusion position relative to the apparatus body 2 is as shown in FIG. 3.

Thus, the user can place a desired optical disk on the placement tray 3 in such a protruding state.

Further, the user places the desired optical disk on the placement tray 3 and then operates the operation part 11 so as to reproduce the optical disk (Step S12).

Figure 5:
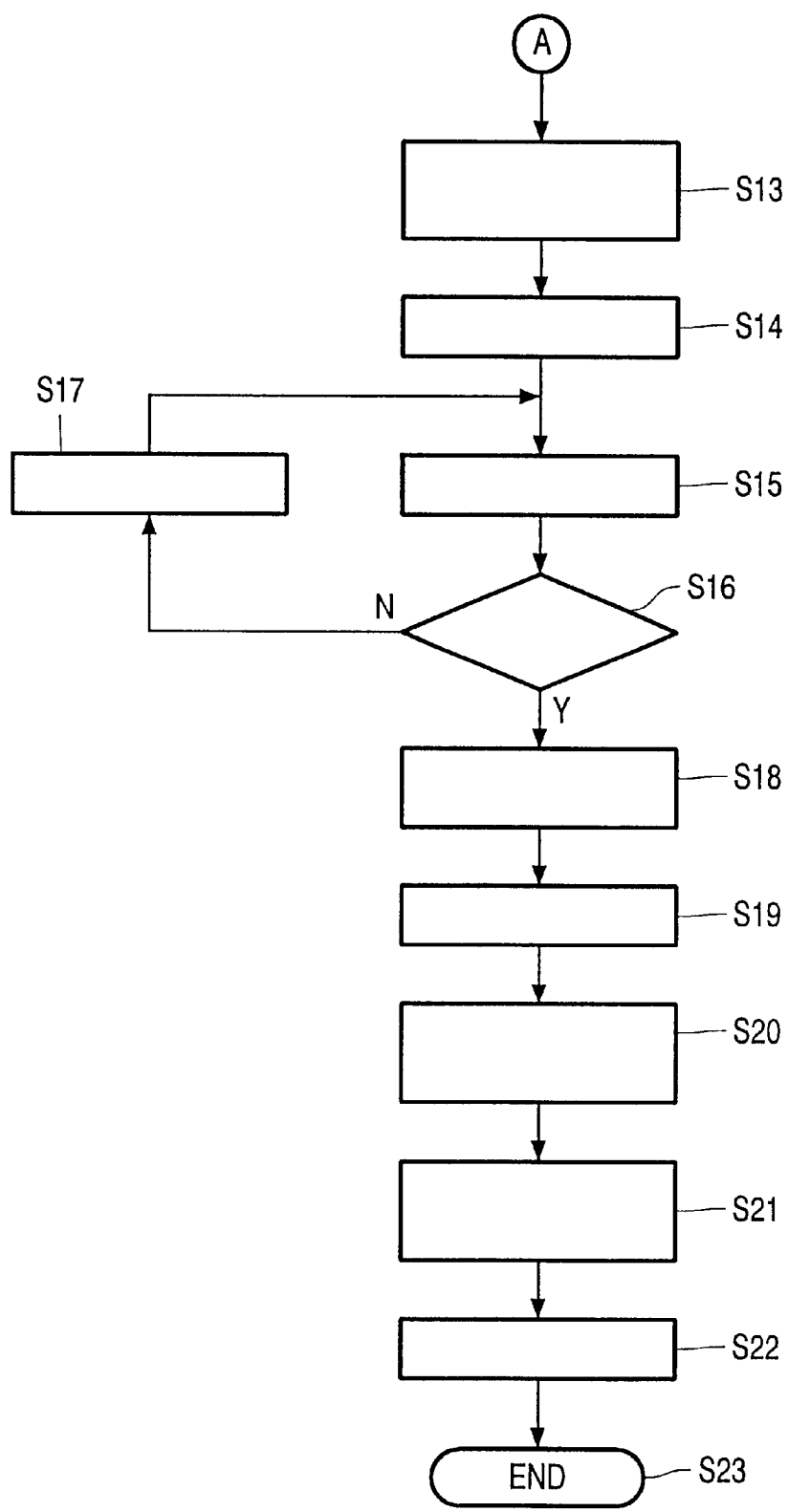
FIG. 5 is a flowchart for explaining a flow from the operation for sliding the placement tray from the protrusion position to the accommodation position to the end in the embodiment shown in FIG. 1.

As shown in FIG. 5, in step S13, the computing means 21 outputs the drive power source 8 an instruction signal for supplying the initial applied voltage of 1.8 V to the driving motor 16.

The control means 15 controls the drive power source 8 to supply a voltage of 1.8 V and then a voltage being higher by 0.2 V at a time in stages to the output motor 16 in the same way as when the placement tray 3 slides from the accommodation position to the protrusion position relative to the apparatus body 2.

In short, the computing means 21 outputs to the drive power source 8 of the driving means 14 a signal for supplying the initial applied voltage of 1.8 V to the output motor 16 on the basis of a signal inputted from the operation part 11 (Step S14).

When the output motor 16 receives the initial applied voltage of 1.8 V supplied from the drive power source 8, it attempts to output rotation, and in case that the rotational output transferred from the output motor 16 to the pinion gear 18 through the gear train 20 is larger than a load imposed when the placement tray 3 starts sliding, the rotational output from the pinion gear 18 starts the placement tray 3 sliding through the rack gear 17 in the direction of arrow B.

At this time, the detection means 22 detect whether the rotator 23 is turned by receiving the rotational output from the output motor 16 of the driving means 14 and the optical sensor 24 optically senses the rotation of the rotator 23 and sends a fact that the rotator 23 is turning to the computing means 21 by means of a signal (Step S16).

Hereupon, the computing means 21 judges that the placement tray 3 has started sliding and continues sliding.

On the other hand, in case that a load imposed when the placement tray 3 starts sliding is larger than the rotational output from the output motor 16, a state where the placement tray 3 keeps a stop state and does not start sliding continues.

At this time the optical sensor 24 of the detection means 22 sends a fact that variation in brightness of the striped pattern does not occur to the computing means 21 by means of a signal.

Hereupon, when a state where the placement tray 3 is at a stop and does not start sliding continues, the computing means 21 outputs an instruction signal to the drive power source 8 so as to apply a voltage being higher by 0.2 V (Step S17). The voltage is applied to the output motor 16 each time a time of 0.3 second elapses (Step S15).

As the result, the placement tray 3 starts sliding from the protrusion position to the accommodation position relative to the apparatus body 2.

At the start of sliding, since the output motor 16 drives the gear train 20 by a rotational output slightly larger than a load imposed on the placement tray 3, the placement tray 3 starts sliding at a very low speed and therefore the optical disk does not receive a great inertia force by the sliding and is kept in a state where the optical disk is stably placed on the placement tray 3 without being slipped off in position.

The placement tray 3 slides at a high speed from the middle course (Step S19), but decreases its sliding speed (Step S20) and becomes slow from a position at a certain distance before the accommodation position being its stop position relative to the apparatus body 2 is reached in step S21.

Therefore, also when the placement tray 3 stops, the optical disk does not receive a great inertia force by the sliding and is kept in a state where the optical disk is stably placed on the placement tray 3 without being slipped off in position.

The applied voltages supplied from the drive power source 8 to the output motor 16 when the placement tray 3 slides from the protrusion position to the accommodation position relative to the apparatus body 2 are as shown in FIG. 2, and the sliding speed of the placement tray 3 relative to the apparatus body 2 is as shown in FIG. 3.

When the placement tray 3 is accommodated in the apparatus body 2 and is positioned at a normal position, the optical disk placed on the placement tray 3 is mounted on the turntable 6 of the pickup means 5 by operation of the computing means 21 (description of its function is omitted).

Hereupon, in step S22, the pickup means 5 starts operating. Namely, the computing means 21 applies to the drive power source 8 an instruction signal for applying a voltage so that the output motor 7 outputs rotation and the turntable 6 turns. When the output motor 7 outputs rotation and the turntable 6 turns, the information reading means 9 picks up and sends recorded information from the optical disk to the computing means 21.

The computing means 21 performs a specified process on the information signal from the information reading means 9 and then outputs it as a reproduction signal.

When the information reading means 9 finishes reading out recorded information from the optical disk, it notifies this fact of the computing means 21 by means of a signal.

In step S23, the computing means 21 receives such a signal and outputs to the drive power source 8 an instruction signal for stopping application of a voltage to the output motor 7, and the optical disk reproduction apparatus 1 ends reproduction of information, namely, performance of the optical disk on the placement tray 3.

In the optical disk reproduction apparatus 1, the initial applied voltage from the drive power source 8 to the output motor 16 of the driving means 14 is 1.8 V, and a voltage to be added in case that the placement tray 3 does not start sliding is 0.2 V, but it is desirable that an initial applied voltage to the output motor 16 and a voltage to be added are properly selected on the basis of a load consisting of the gear train 20, the rack gear 17 and the pinion gear 18, and the magnitude of rotational output of the output motor 16 and on the basis of an environmental condition and the like under which the apparatus is used.

And in the optical disk reproduction apparatus 1, a time counted by the built-in timer of the computing means 21 before an additional voltage is supplied in case that the placement tray 3 does not start sliding even though an initial applied voltage is supplied to the output motor 16 is 0.3 second, but it is preferable to properly set said time at request.

Further, the maximum applied voltage to be supplied from the drive power source 8 to the output motor 16 is 5.0 V, but it is preferable to properly select the maximum applied voltage on the basis of the rotational output of the output motor 16, the maximum speed desired for sliding of the placement tray 3, the stability of an optical disk on the placement tray 3 and the like.

Additionally, variation in voltage from the initial applied voltage to be supplied to the output motor 16 or from a voltage at the start of the mounting tray 3, said voltage being made higher by being added every 0.3 second to 5.0 V and variation in voltage from 5.0 V to the applied voltage of 1.8 V at the stop of the tray 3 are changed according to detection of rotation of the rotator 23 by the detection means 22, but it is desirable that said variations in voltage are properly set on the basis of the total time required for sliding the placement tray 3, the stability of an optical disk on the placement tray 3 and the like.

In the optical disk reproduction apparatus 1, the detection means 22 for detecting sliding of the placement tray 3 is composed mainly of the computing means 21, the rotator 23 having a striped pattern extending in radial directions and the optical sensor 24 for optically sensing rotation of the rotator 23, but it may be a tachometer generator and the like which operate by receiving a rotational output from the gear train 20.

The optical disk reproduction apparatus 1, when the placement tray 3 starts sliding, increases the applied voltage to the output motor 16 by 0.2 V at a time in stages on the basis of operation of the detection means 22 finally to 5.0 V, and decreases the applied voltage to the output motor 16 from a position at a certain distance before the stop position, but it may provide the computing means 21 with a judging function for judging whether or not the placement tray 3 comes into a high-speed sliding state and then reaches a position at a certain distance before the stop position, and may decrease the applied voltage to the output motor 16 on the basis of such a judging function of the computing means 21 and thereby obtain a sure deceleration of the placement tray 3.

The present invention is an optical disk reproduction apparatus which can surely start a placement tray sliding without being influenced by variation of an environmental condition under which the apparatus is used when the placement tray for an optical disk starts sliding so as to take a protrusion position from an accommodation position or take the accommodation position from the protrusion position relative to the apparatus body by increasing an applied voltage to be supplied to an output motor until the placement tray starts sliding in case that the placement tray is kept in a stop state and does not start sliding due to a large load imposed on it when starting the placement tray sliding relative to the apparatus body by supplying an initial applied voltage to the output motor of a driving means and operating the driving means, and further which optical disk reproduction apparatus can keep the sliding speed at the start of sliding as low as desired so as not to be faster than a necessary speed, and therefore can slide the placement tray while keeping the optical disk placed on the placement tray surely in a stable state, and as a result can surely access the optical disk.

What is claimed is:

1. A reproduction apparatus of an optical disk, comprising an apparatus body inside which pickup means for picking up recorded information from the optical disk is provided, a placement tray for placing the optical disk, and slide means for sliding the placement tray so as to take a protrusion position for placing and taking out the optical disk and an accommodation position for reproducing the optical disk with respect to the apparatus body, the slide means including driving means having an output motor and a drive power source for supplying an applied voltage to the output motor, the driving means applying a driving force for sliding the placement tray characterized by control means for controlling the voltage which is applied by the drive power source, which control means, in order to displace the placement tray first apply a preset initial applied voltage, and which in case the placement tray remains in a stop state increase the applied voltage until the placement tray starts to displace.

2. A reproduction apparatus of an optical disk according to claim 1, wherein detection means for detecting that the placement tray starts sliding to the apparatus body comprises a rotator for rotating by rotational output of the output motor of the driving means, the rotator to which a striped pattern extending in the radial direction is formed, and an optical sensor for sensing rotation of the striped pattern of the rotator through optical tone variation.

* * * * *